United States Patent
Takashima et al.

(10) Patent No.: US 7,328,637 B2
(45) Date of Patent: Feb. 12, 2008

(54) APPARATUS FOR MACHINING A CYLINDER BORE SURFACE AND METHOD OF MACHINING THE CYLINDER BORE SURFACE USING THE APPARATUS

(75) Inventors: Kazuhiko Takashima, Kanagawa (JP); Tatsuomi Nakayama, Kanagawa (JP); Minoru Ota, Kanagawa (JP); Manabu Wakuda, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 254 days.

(21) Appl. No.: 11/116,331

(22) Filed: Apr. 28, 2005

(65) Prior Publication Data

US 2005/0245178 A1 Nov. 3, 2005

(30) Foreign Application Priority Data

Apr. 28, 2004 (JP) .............................. 2004-132300
May 7, 2004 (JP) .............................. 2004-138179

(51) Int. Cl.
  *B23B 41/00* (2006.01)
(52) U.S. Cl. .................... 82/1.11; 82/1.4; 82/1.2; 408/124; 408/150
(58) Field of Classification Search ............... 408/147, 408/150, 173; 82/1.2
See application file for complete search history.

(56) References Cited

U.S. PATENT DOCUMENTS

| 3,599,517 | A | * | 8/1971 | Muller | 82/131 |
| 4,617,833 | A | * | 10/1986 | Hall et al. | 74/110 |
| 4,869,127 | A | * | 9/1989 | Ariyoshi | 475/1 |
| 4,893,514 | A | * | 1/1990 | Gronert et al. | 73/862.55 |
| 5,036,928 | A | * | 8/1991 | Mark | 175/263 |
| 7,134,304 | B2 | * | 11/2006 | Nakayama et al. | 72/102 |
| 2001/0035326 | A1 | * | 11/2001 | Furuta et al. | 192/56.61 |
| 2007/0010173 | A1 | * | 1/2007 | Takashima et al. | 451/28 |

FOREIGN PATENT DOCUMENTS

JP    2002-307310 A    10/2002

\* cited by examiner

*Primary Examiner*—Monica Carter
*Assistant Examiner*—Sara Addisu
(74) *Attorney, Agent, or Firm*—Foley & Lardner LLP

(57) ABSTRACT

An apparatus for machining a circumferential surface defining a cylindrical bore of a workpiece, the apparatus including a tool holder rotatable about a first rotation axis, and a form roller supported on the tool holder so as to be rotatable about a second rotation axis parallel to a central axis of the cylindrical bore of the workpiece. The form roller has a diameter smaller than a diameter of the cylindrical bore of the workpiece and is adapted for forming a plurality of microscopic recesses on the circumferential surface defining the cylindrical bore of the workpiece.

20 Claims, 5 Drawing Sheets

APPARATUS FOR MACHINING A CYLINDER BORE SURFACE AND METHOD OF MACHINING THE CYLINDER BORE SURFACE USING THE APPARATUS

BACKGROUND OF THE INVENTION

The present invention relates to an apparatus for machining an inner circumferential surface of a workpiece which defines a cylindrical bore, for instance, a cylinder bore surface of a cylinder block of an engine for automobiles, and a method of machining the inner circumferential surface using the apparatus. More specifically, the present invention relates to an apparatus for use upon boring the inner circumferential surface of the workpiece and forming microscopic recesses as oil retention portions on the inner circumferential surface in order to reduce friction on the inner circumferential surface, and relates to a method of machining the inner circumferential surface using the apparatus.

Conventionally, upon boring a cylinder bore surface of a cylinder block of an engine and forming a plurality of microscopic recesses on the cylinder bore surface, the cylinder bore surface is subjected to boring and honing and then subjected to shot blasting to form the microscopic recesses thereon. Upon shot blasting, a masking sheet with through-holes having a predetermined shape is attached to the cylinder bore surface, and then small-diameter shots, such as ceramic balls, are blasted with compressed air against the cylinder bore surface. As a result, microscopic recesses are formed on a part of the cylinder bore surface which is exposed outside through the through-holes. Subsequently, the masking sheet is taken off, and the cylinder bore surface is subjected to cleaning and honing to thereby remove protrudent portions projecting around the recesses which are formed upon shot blasting. Japanese Patent Application First Publication No. 2002-307310 describes such a masking and blasting method as explained above.

SUMMARY OF THE INVENTION

However, in the conventional machining of the cylinder bore surface as described above, the boring process and the microscopic recess-forming process are separately and independently conducted. This causes increase in total machining time, facility cost and facility-occupying floor space. Particularly, in the shot blasting process, the operations of attaching and removing the masking sheet are inevitably required, thereby failing to improve the productivity. In addition, the use of the disposable masking sheet requires increased costs for a masking sheet material and adhesives, and the costs of forming the through-holes in the masking sheet each time upon conducting the microscopic recess-forming process. This results in significant increase in production cost for production of the cylinder bore surface having the microscopic recesses. Further, it is difficult to uniformly form the microscopic recesses on the cylinder bore surface by shot blasting.

It is an object of the present invention to provide an apparatus for machining a cylinder bore surface of a workpiece and a method of machining the cylinder bore surface using the apparatus, which are capable of uniformly forming microscopic recesses on the cylinder bore surface, reducing the total machining time, improving the productivity and saving the production costs such as the facility cost and costs for ensuring the facility-occupying floor space.

In one aspect of the present invention, there is provided an apparatus for machining a circumferential surface defining a cylindrical bore of a workpiece, the apparatus comprising:
  a tool holder rotatable about a first rotation axis; and
  a form roller supported on the tool holder so as to be rotatable about a second rotation axis parallel to a central axis of the cylindrical bore of the workpiece, the form roller having a diameter smaller than a diameter of the cylindrical bore of the workpiece and being adapted for forming a plurality of microscopic recesses on the circumferential surface defining the cylindrical bore of the workpiece.

In a further aspect of the present invention, there is provided a method of machining a circumferential surface defining the cylindrical bore of a workpiece using the above apparatus, the method comprising:
  placing the tool holder and the workpiece in a position in which the form roller is disposed within the cylindrical bore of the workpiece under condition that a rotation axis of the tool holder and a central axis of the cylindrical bore are in alignment with each other;
  radially moving the form roller until an outer circumferential portion of the form roller is brought into contact with the circumferential surface defining the cylindrical bore of the workpiece; and
  relatively axially moving the tool holder and the workpiece while rotating the tool holder and pressing the outer circumferential portion of the form roller against the circumferential surface defining the cylindrical bore of the workpiece.

DETAILED DESCRIPTION OF THE INVENTION

Figure 1:
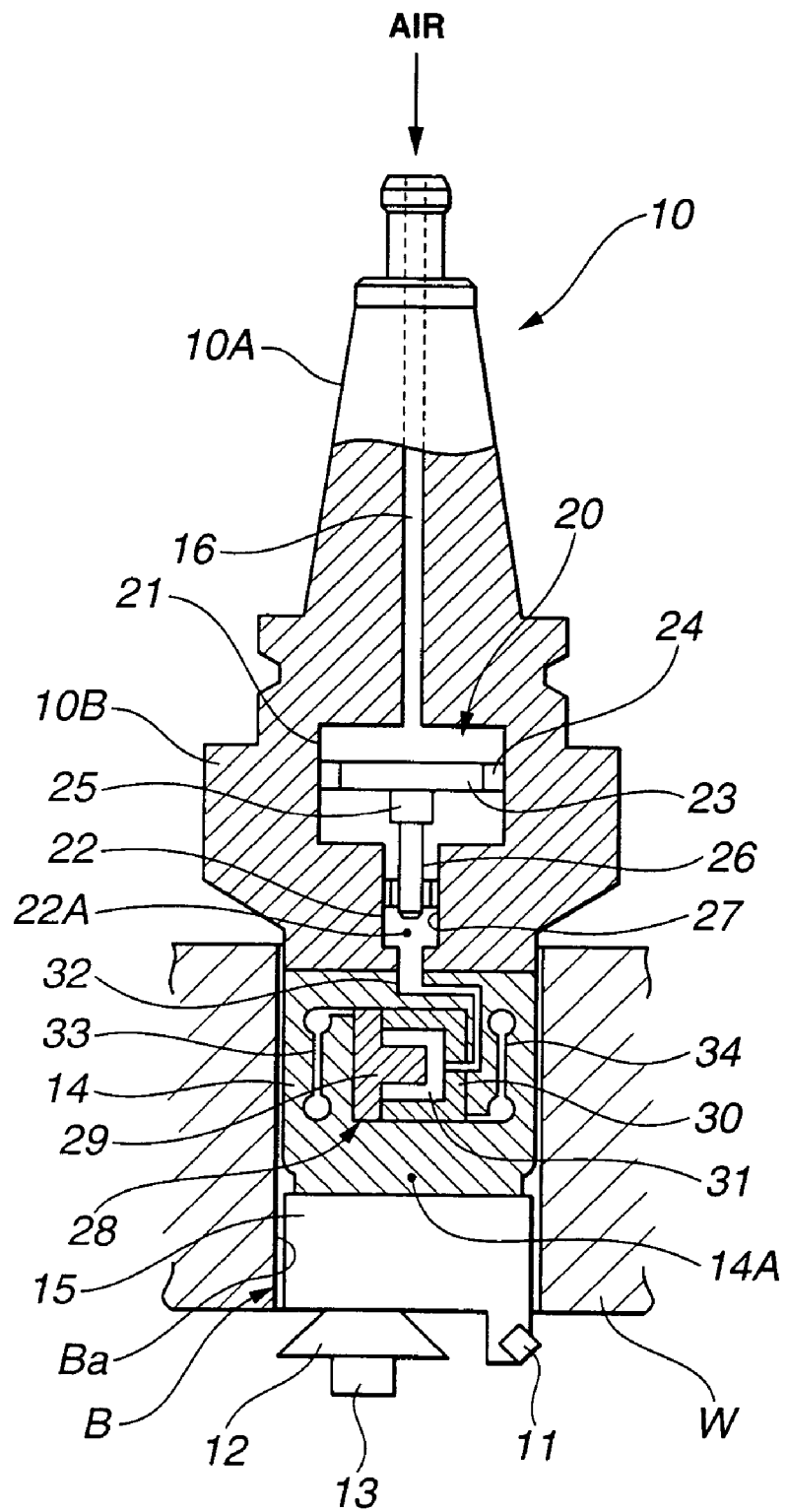
FIG. 1 is a sectional view of an apparatus according to the present invention, of a first embodiment.

In the followings, embodiments of the present invention will be described with reference to the accompanying drawings. The terms "upper", "lower", "upward", "downward", "rightward" and "leftward" used in the description merely denote directions as viewed in the drawings. FIG. 1 illustrates a first embodiment of an apparatus for machining an inner circumferential surface of a workpiece which defines a cylindrical bore, according to the present invention. In the first embodiment as shown in FIG. 1, the workpiece is cylinder block W of an engine for automobiles, and the cylindrical bore of the workpiece is cylinder bore B defined by inner circumferential surface Ba of cylinder block W.

Inner circumferential surface Ba is subjected to boring and formation of a number of microscopic recesses as explained later. The first embodiment of the apparatus according to the present invention may be applied to a machine tool, for instance, a numerical control machine tool, i.e., a NC machine tool.

Figure 2:
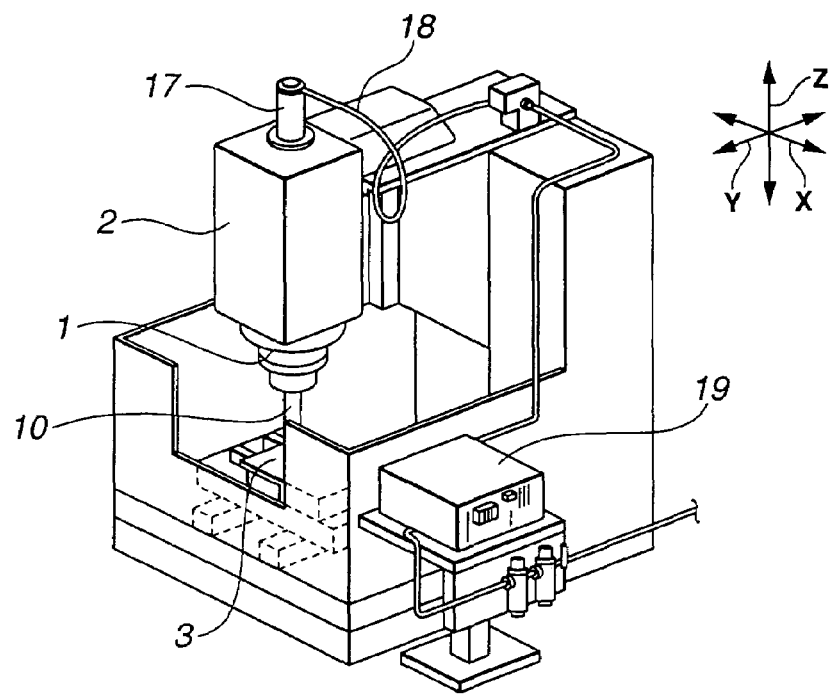
FIG. 2 is a perspective view of a machine tool to which the apparatus of the present invention is applicable.

Referring to FIG. 2, there is shown a machine tool to which the first embodiment of the apparatus of the present invention can be applied. The machine tool includes main shaft 1 projecting from main shaft head 2, and support platform 3 disposed below main shaft head 2. Workpiece W is retained on support platform 3. Tool holder 10 is mounted to main shaft 1. Main shaft head 2 is moveable in vertical direction Z as shown in FIG. 2. Support platform 3 is moveable in two directions X and Y, as shown in FIG. 2, perpendicular to each other in a horizontal plane and perpendicular to direction Z. Tool holder 10 mounted to main shaft 1 is driven to rotate about rotation axis L1 together with main shaft 1. Tool holder 10 is detachable from main shaft 1 using an automatic tool interchange device, not shown.

Referring back to FIG. 1, tool holder 10 supports boring blade 11 for boring inner circumferential surface Ba of cylinder block W to enlarge cylinder bore B, and form roller 12 for forming microscopic recesses on inner circumferential surface Ba. Form roller 12 has a number of microscopic recesses on an outer circumferential portion thereof. Form roller 12 may be made of a suitable material, for instance, carbide, hard metal other than carbide, alumina, ceramic such as silicon nitride, and the like. Form roller 12 has a diameter smaller than a diameter of cylinder bore B and is rotatably supported by shaft 13. Form roller 12 is rotatable about rotation axis L2 of shaft 13 which is parallel to rotation axis L1 of tool holder 10.

Specifically, tool holder 10 includes shank 10A mounted to main shaft 1, body 10B continuously connected with shank 10A, elastic deformation section 14 mounted to body 10B, and boring bar 15 supported on elastic deformation section 14. Boring blade 11 and form roller 12 are mounted to boring bar 15. Boring blade 11 and form roller 12 are arranged in an opposed relation to each other in a diametrical direction of tool holder 10. Boring blade 11 and form roller 12 project outwardly from diametrically opposed peripheries of boring bar 15.

Shank 10A of tool holder 10 has air passage 16 extending coaxially with shank 10A, namely, rotation axis L1 of tool holder 10. Air passage 16 is open at an upper end of shank 10A of tool holder 10 and communicated with an air passage formed in main shaft 1 upon mounting tool holder 10 to main shaft 1. The air passage of main shaft 1 is connected to air controller 19 via rotary joint 17 and air tube 18 as shown in FIG. 2. Air passage 16 of tool holder 10 is supplied with air fed from an air supply source, not shown. Air controller 19 controls an air pressure supplied to air passage 16.

Body 10B of tool holder 10 has therein air-hydraulic pressure conversion section 20 for converting an air pressure into a hydraulic pressure. Air-hydraulic pressure conversion section 20 cooperates with elastic deformation section 14 to function as a driver for moving boring blade 11 and form roller 12 in the diametrical direction of tool holder 10. Air-hydraulic pressure conversion section 20 includes large-diameter cylinder 21 to which a lower end of air passage 16 is open, and small-diameter cylinder 22 disposed coaxially with large-diameter cylinder 21 and communicated therewith. Large-diameter piston 23 is disposed within large-diameter cylinder 21 and axially slidable on a circumferential surface thereof via slide seal 24. Small-diameter piston 26 is connected with large-diameter piston 23 via connection rod 25. Small-diameter piston 26 is axially slidable on a circumferential surface of small-diameter cylinder 22 via slide seal 27. Hydraulic fluid chamber 22A is disposed in small-diameter cylinder 22 and filled with a hydraulic fluid.

When the air pressure supplied to air passage 16 is exerted on large-diameter piston 23, pistons 23 and 26 are downwardly moved together to cause increase in hydraulic pressure within hydraulic fluid chamber 22A. Thus, air-hydraulic pressure conversion section 20 carries out conversion from air pressure to hydraulic pressure.

Elastic deformation section 14 acts as the driver for moving boring bar 15 holding boring blade 11 and form roller 12 in the diametrical direction of tool holder 10, and is elastically deformable in the diametrical direction of tool holder 10 by a pressure applied thereto. Elastic deformation section 14 is mounted to body 10B of tool holder 10 and retains boring bar 15 holding boring blade 11 and form roller 12. Elastic deformation section 14 includes power unit 28 as a hydraulic driving source for hydraulically operating elastic deformation section 14. Power unit 28 is disposed within elastic deformation section 14 and constituted of convex block 29, concave block 30 and hydraulic pressure chamber 31 defined between convex block 29 and concave block 30. Hydraulic pressure chamber 31 is communicated with hydraulic fluid chamber 22A of air-hydraulic pressure conversion section 20 via hydraulic passage 32 extending therebetween through body 10B of tool holder 10 and elastic deformation section 14. Elastic deformation section 14 further includes slits 33 and 34 formed therein. Specifically, as shown in FIG. 1, slit 33 includes a lateral portion extending leftward from an upper end portion of convex block 29, and a vertical portion extending downward from an end of the lateral portion. As shown in FIG. 1, slit 34 includes a lateral portion extending rightward from a lower end portion of concave block 30, and a vertical portion extending upward from an end of the lateral portion.

When the hydraulic pressure converted from air pressure by air-hydraulic pressure conversion section 20 is applied to hydraulic pressure chamber 31 of power unit 28, the hydraulic pressure is transmitted into elastic deformation section 14 via slits 33 and 34 so that lower-moveable portion 14A of elastic deformation section 14 is moved together with boring bar 15 in the diametrical direction of tool holder 10 in which boring blade 11 and form roller 12 are opposed to each other.

Elastic deformation section 14 supporting boring bar 15 holding boring blade 11 and form roller 12 through boring bar 15 is operated to move between an initial position when air pressure is not supplied to air-hydraulic pressure conversion section 20, and a maximum displacement position when a maximum air pressure is supplied to air-hydraulic pressure conversion section 20. At each of the initial and maximum displacement positions, rotation axis L1 of tool holder 10 is in alignment with central axis Bc of cylinder bore B. Specifically, in the initial position of elastic deformation section 14, one of boring blade 11 and form roller 12 is radially outwardly disposed within cylinder bore B and the other of boring blade 11 and form roller 12 is radially inwardly disposed within cylinder bore B when rotation axis L1 of tool holder 10 is in alignment with central axis Bc of cylinder bore B. In the maximum displacement position of elastic deformation section 14, the one of boring blade 11 and form roller 12 is radially inwardly disposed within cylinder bore B and the other of boring blade 11 and form roller 12 is radially outwardly disposed within cylinder bore B when rotation axis L1 of tool holder 10 is in alignment with central axis Bc of cylinder bore B.

Figure 3:
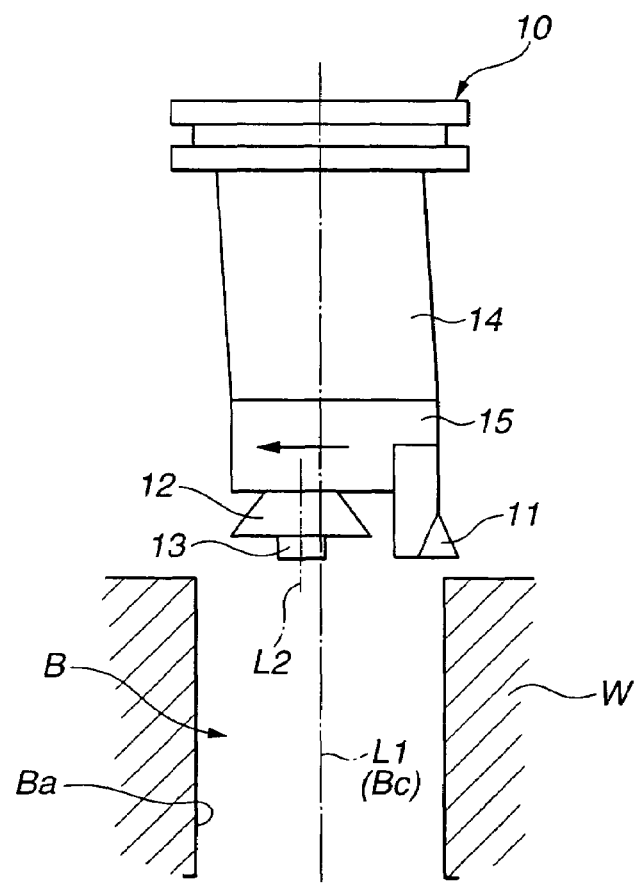
FIG. 3 is a schematic side view of the apparatus of the first embodiment, showing an initial state of the apparatus.

FIG. 3 illustrates the initial position of elastic deformation section 14 of the first embodiment of the present invention. In the initial position shown in FIG. 3, boring blade 11 is radially outwardly disposed within cylinder bore B and form roller 12 is radially inwardly disposed within cylinder bore B.

Figure 6:
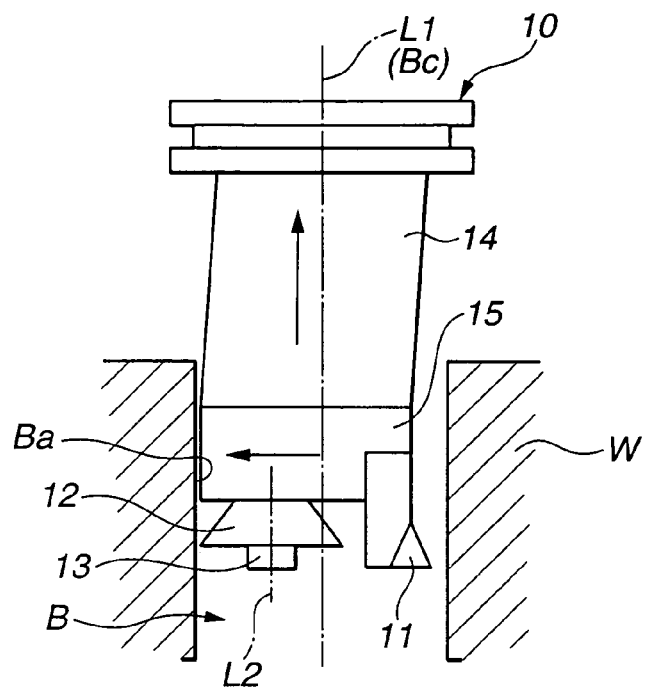
FIG. 6 is a view similar to FIG. 3, but showing an operation of forming microscopic recesses on the cylinder bore surface of the cylinder block of the engine.

FIG. 6 illustrates the maximum displacement position of elastic deformation section 14 of the first embodiment of the present invention. In the maximum displacement position shown in FIG. 6, boring blade 11 is radially inwardly disposed within cylinder bore B and form roller 12 is radially outwardly disposed within cylinder bore B.

When elastic deformation section 14 is moved between the initial position and the maximum displacement position depending on increase and decrease in the air pressure supplied to air-hydraulic pressure conversion section 20, boring blade 11 and form roller 12 are moved within cylinder bore B. Therefore, an amount of cutting of boring blade 11 relative to inner circumferential surface Ba of cylinder block W and an amount of pressing of form roller 12 relative thereto can be desirably adjusted with high accuracy. This achieves boring of inner circumferential surface Ba of cylinder block W and formation of the microscopic recesses on inner circumferential surface Ba with high accuracy.

Upon using the thus-constructed apparatus, the boring operation using boring blade 11 is carried out when tool holder 14 and cylinder block W are relatively moved in one direction such that tool holder 14 is inserted into cylinder bore B of cylinder block W, and the microscopic recess-forming operation using form roller 12 is carried out when tool holder 14 and cylinder block W are relatively moved in a reverse direction such that tool holder 14 is retreated from cylinder bore B of cylinder block W.

Figure 4:
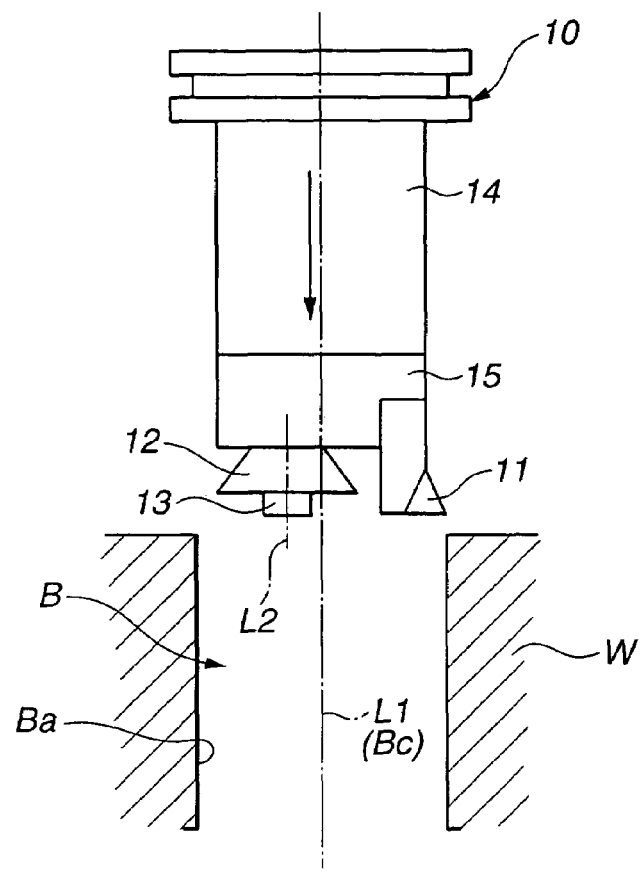
FIG. 4 is a view similar to FIG. 3, but showing a state of starting an operation of boring a cylinder bore surface of a cylinder block of an engine.

Specifically, first, cylinder block W is set on support platform 3 in such a manner that rotation axis L1 of tool holder 10 and central axis Bc of cylinder bore B are aligned with each other and tool holder 10 and cylinder block W are placed in the initial position as shown in FIG. 3. Then, tool holder 10 and cylinder block W are relatively moved in an axial direction so as to become close to each other and be placed in a boring operation position as shown in FIG. 4. In the boring operation position as shown in FIG. 4, the cutting amount of boring blade 11 relative to inner circumferential surface Ba of cylinder block W is suitably adjusted. In this state, tool holder 10 is rotated about rotation axis L1, and at the same time, main shaft head 2 with tool holder 10 is downwardly moved as indicated by arrow in FIG. 4. Boring blade 11 held on tool holder 10 through boring bar 15 is downwardly moved from an upper end of inner circumferential surface Ba to a lower end thereof while pressing an outer periphery of boring blade 11 against inner circumferential surface Ba. By the downward movement of boring blade 11, inner circumferential surface Ba is cut by the outer periphery of boring blade 11 to thereby achieve boring of inner circumferential surface Ba over the entire axial length of cylinder bore B. On the other hand, an outer circumferential portion of form roller 12 is kept apart from inner circumferential surface Ba of cylinder block W during the downward movement of boring blade 11.

Figure 5:
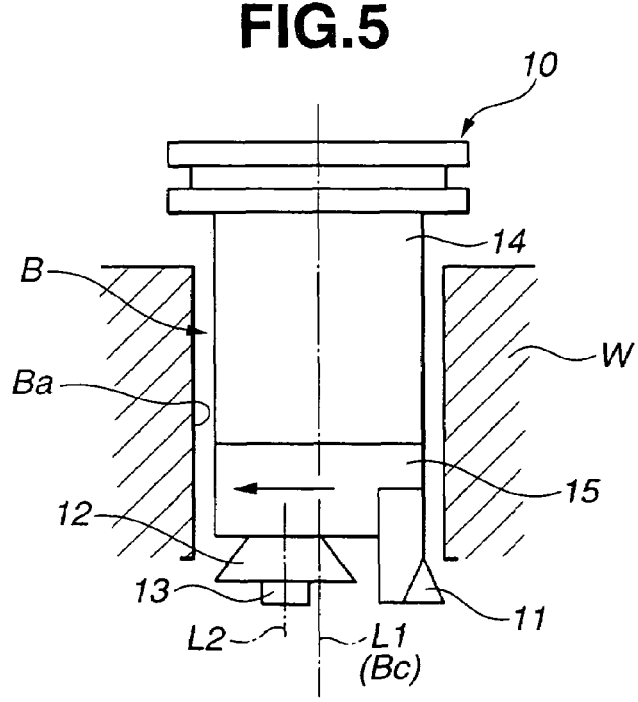
FIG. 5 is a view similar to FIG. 3, but showing a state of finishing the boring operation.

Subsequent to completion of the boring operation of boring blade 11, boring blade 11 and form roller 12 are moved in a radial direction of cylinder bore B as indicated by leftward arrow in FIG. 5 to a microscopic recess-forming operation position as shown in FIG. 6, by increasing the air pressure supplied to air-hydraulic pressure conversion section 20. Namely, the microscopic recess-forming operation position corresponds to the maximum displacement position of elastic deformation section 14. In the microscopic recess-forming operation position, the pressing amount of form roller 12 relative to inner circumferential surface Ba of cylinder block W is suitably adjusted. Main shaft head 2 with tool holder 10 is then upwardly moved while rotating tool holder 10. Form roller 12 held on tool holder 10 through boring bar 15 is upwardly moved from the lower end of inner circumferential surface Ba to the upper end thereof while turning about rotation axis L1 of tool holder 10, namely, central axis Bc of cylinder bore B, and rotating about rotation axis L2 of shaft 13. During this upward movement of form roller 12, the outer circumferential portion of form roller 12 is pressed against inner circumferential surface Ba. As a result, microscopic recesses are formed on inner circumferential surface Ba over the entire axial length of cylinder bore B. At this time, if form roller 12 held on tool holder 10 and pressed against inner circumferential surface Ba is upwardly moved along central axis Bc of cylinder bore B while turning thereabout and rotating about rotation axis L2 under condition that rotation axis L2 of shaft 13 is parallel to central axis Bc of cylinder bore B, the microscopic recesses can be in the form of a spiral groove continuously extending. In contrast, the outer periphery of boring blade 11 is kept apart from inner circumferential surface Ba of cylinder block W during the upward movement of form roller 12.

If the outer circumferential portion of form roller 12 has a circular shape, the microscopic recesses formed on inner circumferential surface Ba can be in the form of a continuous groove. If the outer circumferential portion of form roller 12 has a plurality of projections arranged at predetermined intervals, the microscopic recesses formed on inner circumferential surface Ba can be in the form of dimples arranged at the corresponding intervals. Further, if form roller 12 is intermittently radially moved and pressed against inner circumferential surface Ba while upwardly moving along central axis Bc of cylinder bore B under condition that rotation axis L2 of shaft 13 is parallel to central axis Bc of cylinder bore B, the microscopic recesses can be in the form of a plurality of circumferential grooves axially spaced from each other. If form roller 12 is upwardly moved along central axis Bc of cylinder bore B under condition that rotation axis L2 of shaft 13 is slightly inclined relative to central axis Bc of cylinder bore B, the microscopic recesses formed on inner circumferential surface Ba can be in the form of a spiral groove.

It is preferred that after completion of forming the microscopic recesses on inner circumferential surface Ba, the cutting amount of boring blade 11 is set again and inner circumferential surface Ba is subjected to finish boring by boring blade 11. By carrying out the finish boring, protrudent portions formed near around the microscopic recesses upon forming the microscopic recesses are removed so that inner circumferential surface Ba with high precision can be obtained.

As be explained above, according to the first embodiment of the apparatus and method for machining inner circumferential surface Ba of cylinder block W of the engine, the boring operation and the microscopic recess-forming operation can be continuously and effectively performed by a single apparatus. This achieves reduction of the total machining time and improvement of the productivity, to thereby considerably save the production costs such as facility cost and costs for ensuring facility-occupying floor space.

Further, upon forming the microscopic recesses on inner circumferential surface Ba of cylinder block W, form roller 12 is used without need of the disposable masking sheet as conventionally used. This attains efficient formation of the microscopic recesses with high accuracy and realizes further improvement of productivity and more saving of the production costs.

Further, elastic deformation section 14 is operated to move between the initial position and the maximum displacement position by varying the air pressure supplied to air-hydraulic pressure conversion section 20. Namely, when elastic deformation section 14 is placed in the initial position and the maximum displacement position under condition that rotation axis L1 of tool holder 10 and central axis Bc of cylinder bore B are aligned with each other, the outer periphery of boring blade 11 is radially outwardly disposed within cylinder bore B and the outer circumferential portion of form roller 12 is radially inwardly disposed within cylinder bore B. In contrast, when elastic deformation section 14 is placed in the maximum displacement position in the same condition, the outer periphery of boring blade 11 is radially inwardly disposed within cylinder bore B and the outer circumferential portion of form roller 12 is radially outwardly disposed within cylinder bore B. Therefore, both the cutting amount of boring blade 11 and the pressing amount of form roller 12 can be set with high accuracy by simply controlling the air pressure supplied to air-hydraulic pressure conversion section 20.

Further, microscopic recesses having various shapes can be formed on inner circumferential surface Ba of cylinder block W by selecting a shape of the outer circumferential portion of form roller 12. For instance, the outer circumferential portion of form roller 12 is formed with multiple rows of microscopic projections and recesses. Further, the microscopic recesses may be a continuously extending groove or an intermittent groove by controlling the movement of form roller 12.

Figure 7:
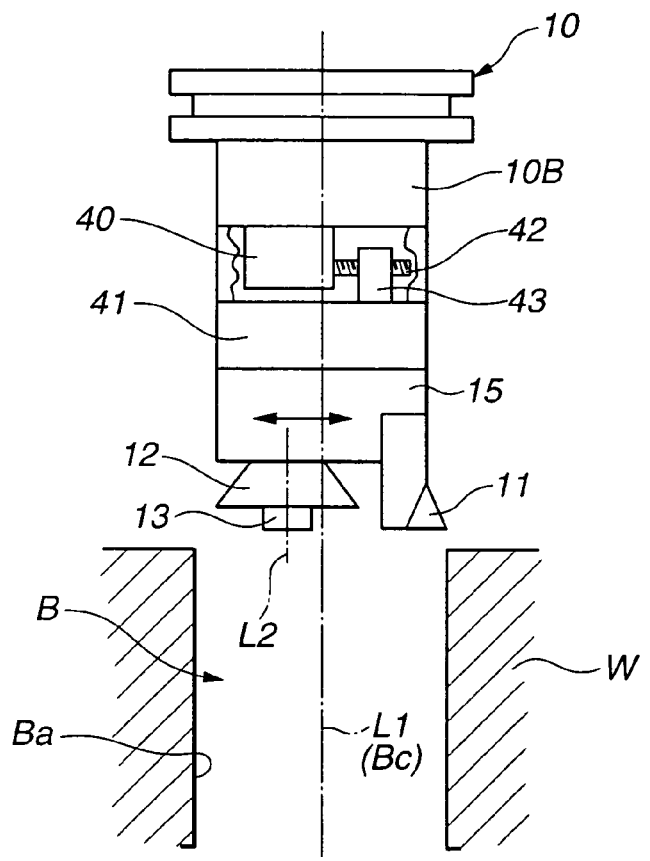
FIG. 7 is a schematic side view of the apparatus of a second embodiment of the present invention.

Referring to FIG. 7, a second embodiment of the apparatus of the present invention now is explained, which differs in construction of the driver for driving boring blade 11 and form roller 12 from the first embodiment. Like reference numerals denotes like parts, and therefore, detailed explanations therefor are omitted. In the second embodiment, there is provided stepping motor 40 and slide 41 cooperating with each other to drive boring blade 11 and form roller 12 in the diametrical direction of tool holder 10. Stepping motor 40 operates slide 41 so as to move between the initial position and the maximum displacement position.

As illustrated in FIG. 7, stepping motor 40 is mounted to body 10B of tool holder 10. Stepping motor 40 includes screw shaft 42 acting as an output shaft. Slide 41 is connected with body 10B of tool holder 10 so as to be slidable in the radial direction of tool holder 10 via a guide mechanism, not shown. Slide 41 is provided with nut 43 that accommodates balls therein and cooperates with screw shaft 42 of stepping motor 40 to form a ball screw. Boring bar 15 holding boring blade 11 and form roller 12 is mounted to slide 41. When stepping motor 40 is energized via a rotational terminal interposed between main shaft 1 and tool holder 10, the rotation of stepping motor 40 is converted to a rectilinear motion of slide 41 with the cooperation of screw shaft 42 and nut 43. Slide 41 with boring bar 15 is moved in the radial direction of tool holder 10 so that boring blade 11 and form roller 12 are moved together in the diametrical direction of tool holder 10.

Similar to the first embodiment, the boring operation and the microscopic recess-forming operation can be achieved using boring blade 11 and form roller 12. The second embodiment of the apparatus of the present invention can attain the same effects as those of the first embodiment. In addition, the positioning of boring blade 11 and form roller 12 relative to inner circumferential surface Ba of cylinder block W can be controlled by electric signals transmitted to stepping motor 42. Accordingly, it is possible to provide tool holder 10 with a receiver to which electric signals are transmitted via radio. This serves for simplifying the construction of the apparatus.

The apparatus and method of the present invention is not limited to the first and second embodiments and may be suitably modified. For instance, in the initial position of elastic deformation section 14 or slide 41, the outer circumferential portion of form roller 12 can be radially outwardly disposed within cylinder bore B and the outer periphery of boring blade 11 can be radially inwardly disposed within cylinder bore B.

Figure 8:
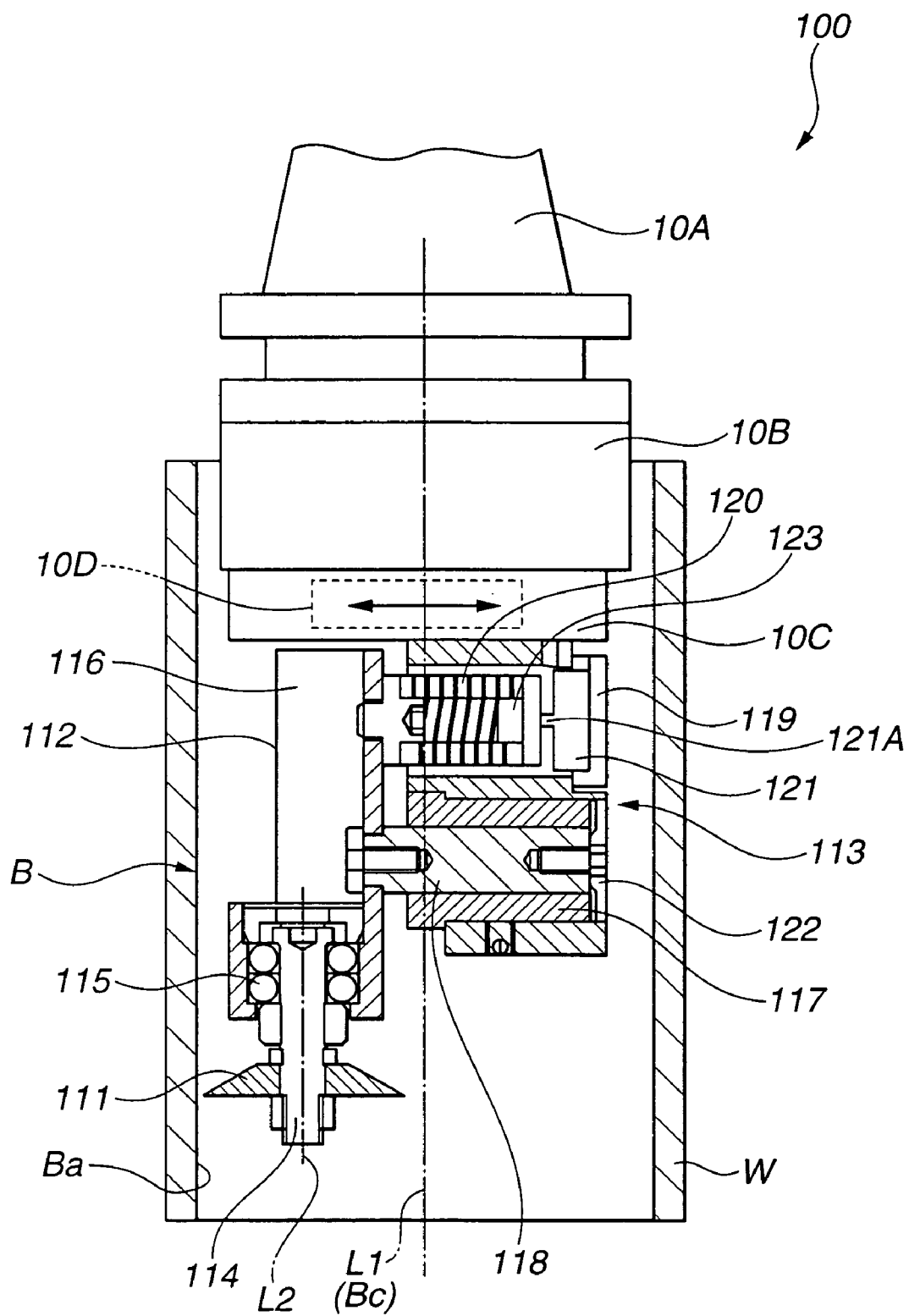
FIG. 8 is a sectional view of the apparatus of a third embodiment of the present invention.

Referring to FIG. 8, there is shown a third embodiment of the apparatus and method of the present invention. The third embodiment differs in omission of the boring blade and construction of the driver for moving the form roller, from the first and second embodiment. Similar to the first and second embodiments, tool holder 100 is mounted to main shaft 1 shown in FIG. 2 and driven to rotate about rotation axis L1 together with main shaft 1. As illustrated in FIG. 8, tool holder 100 includes form roller 111, roller support 112 for supporting form roller 111, and housing 113 retaining roller support 112. Form roller 111 has a number of microscopic recesses on an outer circumferential surface thereof. Form roller 111 may be made of a suitable material, for instance, carbide, hard metal other than carbide, alumina, ceramic such as silicon nitride, and the like. Form roller 111 has a diameter smaller than a diameter of cylinder bore B and is rotatably supported by shaft 114.

Roller support 112 is in the form of an arm, and supports form roller 111 so as to be rotatable about rotation axis L2. Roller support 112 includes support shaft 114 to which form roller 111 is fixed, and support member 116 for supporting support shaft 114. Support shaft 114 is disposed in parallel to main shaft 1. Support member 116 supports support shaft 114 so as to be rotatable about rotation axis L2 via double row angular contact ball bearing 115.

Housing 113 is in the form of a hollow block and connected with body 10B of tool holder 100 via adaptor 10C. Housing 113 includes a lower hollow portion into which spline nut 117 is fitted and fixed thereto. Spline nut 117 meshes with spline shaft 118 connected to support member 116 of roller support 112. Spline nut 117 and spline shaft 118 extend in the direction perpendicular to main shaft 1. With the spline connection between spline nut 117 and spline shaft 118, roller support 112 is moveable in the direction perpendicular to main shaft 1, namely, in a radial direction of roller support 112. Also, roller support 112 is connected with housing 113 with the spline connection between spline nut 117 and spline shaft 118.

Housing 113 includes an upper hollow portion to which cap 119 is fitted. Load applier 120 and load detector 121 are disposed between cap 119 and support member 116 of roller support 112. Load applier 120 applies a load to support member 116 of roller support 112 in the direction perpendicular to main shaft 1, namely, in the radial direction of form roller 111. Owing to the application of the load, the outer circumferential portion of form roller 111 is pressed against inner circumferential surface Ba of cylinder block W while form roller 111 is rotatively operated under condition that rotation axis L1 of tool holder 100 and central axis Bc of cylinder bore B are in alignment with each other. As a result, microscopic recesses are formed on inner circumferential surface Ba of cylinder block W. In this embodiment, load applier 120 is in the form of a compression coil spring. Load detector 121 detects the load applied to support member 116 of roller support 112. In this embodiment, load detector 121 is in the form of a piezoelectric load cell.

Stop 122 is fixed to the lower hollow portion of housing 113 on a side of one axial end of spline shaft 118. Stop 122 has a diameter larger than spline shaft 118 and is made of a suitable soft material such as urethane resin. Stop 122 limits expansion of the compression coil spring as load applier 120 and dampens impact caused when the compression coil spring expands to maximum, to thereby prevent roller support 112 from falling off from housing 113.

Load adjuster 123 for applying a pre-load to load applier 120 is disposed between load applier 120 and load detector 121. The pre-load is controlled by selecting a length of load adjuster 123, that is, a length of the compression coil spring in a direction of the expansion motion. Load detector 121 has spherical projection 121A contacted with load adjuster 123. With the provision of spherical projection 121A, if the compression coil spring is inclined relative to the expansion direction, load detector 121 can effectively detect the load through spherical projection 121A.

Adapter 10C connected with housing 113 includes driver 10D for moving roller support 112 together with form roller 111 supported on roller support 112 and load applier 120 in a direction perpendicular to rotation axis L1 of tool holder 100. By actuating driver 10D, form roller 111 can be moved close to inner circumferential surface Ba of cylinder block W and apart therefrom. Driver 10D includes a stepping motor, not shown.

The thus-constructed apparatus of the third embodiment is operated in the following manner. First, cylinder block W is set on support platform 3 in such a manner that rotation axis L1 of tool holder 100 and central axis Bc of cylinder bore B are aligned with each other. Next, tool holder 100 and cylinder block W are relatively moved in an axial direction such that tool holder 100 is inserted into cylinder bore B. Specifically, main shaft head 2 with tool holder 100 is downwardly moved so that form roller 111 held on tool holder 100 is inserted into cylinder bore B.

Driver 10D in adapter 10C is actuated to move form roller 111 in the radial direction thereof until the outer circumferential portion of form roller 111 is brought into contact with inner circumferential surface Ba of cylinder block W. Driver 10D is then kept actuated until a load applied by load applier 120 and detected by load detector 121 reaches a predetermined value. The load is variably applied to form roller 111 in the radial direction during pressing the outer circumferential portion of form roller 111 against inner circumferential surface Ba of cylinder block W.

Specifically, when driver 10D is kept actuated after the outer circumferential portion of form roller 111 is contacted with inner circumferential surface Ba of cylinder block W, load applier 120 is compressed between roller support 112 and housing 113 to thereby cause resiliency therein. The resiliency of load applier 120 acts as a load and is exerted on form roller 111 and detected by load detector 121. Therefore, if driver 10D is kept actuated until the load detected reaches the predetermined value, form roller 111 can be pressed against inner circumferential surface Ba of cylinder block W at a load corresponding to the predetermined value.

When the load detected reaches the predetermined value, driver 10D is stopped and main shaft 1 with tool holder 100 is rotated. Form roller 111 is turned about rotation axis L1, and at the same time, is rotated about rotation axis L2, while the outer circumferential portion of form roller 111 is pressed against inner circumferential surface Ba of cylinder block W. In this condition, when tool holder 100 is downwardly moved in the direction of rotation axis L1, form roller 111 held by tool holder 100 through roller support 112 is downwardly moved along inner circumferential surface Ba. As a result, microscopic recesses are formed on inner circumferential surface Ba of cylinder block W.

Similar to the first and second embodiments, in the third embodiment of the apparatus of the present invention, microscopic recesses can be formed on inner circumferential surface Ba of cylinder block W with high accuracy. By using form roller 111, the disposable masking sheet as conventionally used can be omitted. This achieves reduction of the number of processing steps and saving of the production costs.

Further, similar to the first embodiment, microscopic recesses having various shapes can be formed on inner circumferential surface Ba of cylinder block W by selecting a shape of the outer circumferential portion of form roller 111. Further, the microscopic recesses may be formed as a continuous groove or an intermittent groove by controlling the movement of form roller 111.

Further, a depth and a width of the microscopic recesses can be changed by varying the load applied to form roller 111. In both cases of changing the depth and the width of the microscopic recesses, formation of the microscopic recesses can be performed with high efficiency using form roller 111. Further, a replaceable compression coil spring can be used as load applier 120 in order to vary the load. Furthermore, load applier 120 is not limited to a compression coil spring and may be any other resilient member to apply a sufficient load to roller support 112.

In addition, by the use of form roller 111, abrasion of a tool can be extremely reduced, resulting in prolong life of the tool.

This application is based on prior Japanese Patent Application No. 2004-132300 filed on Apr. 28, 2004 and No. 2004-138179 filed on May 7, 2004. The entire contents of the Japanese Patent Application Nos. 2004-132300 and 2004-138179 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An apparatus for machining a circumferential surface defining a cylindrical bore of a workpiece, the apparatus comprising:
   a tool holder rotatable about a first rotation axis; and
   a form roller supported on the tool holder so as to be rotatable about a second rotation axis parallel to the first rotation axis and a central axis of the cylindrical bore of the workpiece, the form roller having a diameter smaller than a diameter of the cylindrical bore of the workpiece,
   wherein the form roller is moveable in a direction perpendicular to the central axis of the cylindrical bore of the workpiece, and the form roller is turnable about the first rotation axis of the tool holder and is rotatable about the second rotation axis, while being pressed against the circumferential surface defining the cylindrical bore of the workpiece to thereby form a plurality of microscopic recesses on the circumferential surface defining the cylindrical bore during rotation of the tool holder.

2. The apparatus as claimed in claim 1, further comprising a boring blade for boring the circumferential surface defining the cylindrical bore of the workpiece, the boring blade being supported on the tool holder and arranged in an opposed relation to the form roller in a diametrical direction of the tool holder, and a driver for moving the boring blade and the form roller in the diametrical direction of the tool holder.

3. The apparatus as claimed in claim 2, wherein the driver comprises an elastic deformation section elastically deformable to move the boring blade and the form roller in the diametrical direction of the tool holder by a pressure applied thereto in the diametrical direction of the tool holder, the elastic deformation section being mounted to the tool holder and retaining the boring blade and the form roller.

4. The apparatus as claimed in claim 3, wherein the driver further comprises a hydraulic driving source for operating the elastic deformation section, the hydraulic driving source being disposed within the elastic deformation section and having a hydraulic pressure chamber.

5. The apparatus as claimed in claim 4, wherein the driver further comprises an air-hydraulic pressure conversion section for converting an air pressure into a hydraulic pressure, the air-hydraulic pressure conversion section including an air passage through which air is supplied thereinto, and a hydraulic fluid chamber communicated with the hydraulic pressure chamber of the hydraulic driving source.

6. The apparatus as claimed in claim 2, wherein the driver comprises a stepping motor for driving the boring blade and the form roller in the diametrical direction of the tool holder.

7. The apparatus as claimed in claim 6, wherein the driver further comprises a slide cooperating with the stepping motor to drive the boring blade and the form roller.

8. The apparatus as claimed in claim 2, wherein the driver is operative to move between an initial position in which one of the boring blade and the form roller is radially outwardly disposed within the cylindrical bore of the workpiece and the other thereof is radially inwardly disposed within the cylindrical bore of the workpiece when the first rotation axis of the tool holder is in alignment with the central axis of the cylindrical bore of the workpiece, and a maximum displacement position in which the one of the boring blade and the form roller is radially inwardly disposed within the cylindrical bore of the workpiece and the other thereof is radially outwardly disposed within the cylindrical bore of the workpiece when the first rotation axis of the tool holder is in alignment with the central axis of the cylindrical bore of the workpiece.

9. The apparatus as claimed in claim 1, further comprising a roller support supporting the form roller and a load applier applying a load to the roller support in a radial direction of the form roller.

10. The apparatus as claimed in claim 9, further comprising a driver for moving the roller support, the form roller and the load applier in a direction perpendicular to the first rotation axis of the tool holder.

11. The apparatus as claimed in claim 9, wherein the load applier comprises a compression coil spring.

12. The apparatus as claimed in claim 9, further comprising a load detector for detecting the load applied to the roller support.

13. The apparatus as claimed in claim 12, wherein the load detector comprises a load cell.

14. The apparatus as claimed in claim 12, wherein the load applier is disposed between the roller support and the load detector.

15. The apparatus as claimed in claim 12, further comprising a load adjuster for applying a pre-load to the load applier.

16. The apparatus as claimed in claim 15, wherein the load adjuster is disposed between the load applier and the load detector.

17. A method of machining a circumferential surface defining a cylindrical bore of a workpiece using an apparatus for machining the circumferential surface defining the cylindrical bore, wherein the apparatus comprises a tool holder rotatable about a first rotation axis and a form roller supported on the tool holder so as to be rotatable about a second rotation axis parallel to the first rotation axis and a central axis of the cylindrical bore of the workpiece, the form roller having a diameter smaller than a diameter of the cylindrical bore of the workpiece, wherein the form roller is moveable in a direction perpendicular to the central axis of the cylindrical bore of the workpiece, and the form roller is turnable about the first rotation axis of the tool holder and is rotatable about the second rotation axis, while being pressed against the circumferential surface defining the cylindrical bore of the workpiece to thereby form a plurality of microscopic recesses on the circumferential surface defining the cylindrical bore during rotation of the tool holder, wherein the method comprises:
  placing the tool holder and the workpiece in a position in which the form roller is disposed within the cylindrical bore of the workpiece under condition that the first rotation axis of the tool holder and the central axis of the cylindrical bore are in alignment with each other;
  radially moving the form roller until an outer circumferential portion of the form roller is brought into contact with the circumferential surface defining the cylindrical bore of the workpiece; and
  relatively axially moving the tool holder and the workpiece while rotating the tool holder and pressing the outer circumferential portion of the form roller against the circumferential surface defining the cylindrical bore of the workpiece.

18. The method as claimed in claim 17, wherein the apparatus further includes a boring blade for boring the circumferential surface defining the cylindrical bore and a driver for moving the boring blade and the form roller, the boring blade and the form roller being supported on the tool holder in an opposed relation to each other in a diametrical direction of the tool holder, the method further comprising:
  placing the tool holder and the workpiece in a first position in which one of the boring blade and the form roller is radially outwardly disposed within the cylindrical bore of the workpiece and the other thereof is radially inwardly disposed within the cylindrical bore of the workpiece under condition that the first rotation axis of the tool holder and the central axis of the cylindrical bore are in alignment with each other;
  relatively moving the tool holder and the workpiece in an axial direction while rotating the tool holder and pressing an outer periphery of the boring blade against the circumferential surface defining the cylindrical bore of the workpiece;

placing the tool holder and the workpiece in a second position in which the one of the boring blade and the form roller is radially inwardly disposed within the cylindrical bore of the workpiece and the other thereof is radially outwardly disposed within the cylindrical bore of the workpiece under condition that the first rotation axis of the tool holder and the central axis of the cylindrical bore are in alignment with each other; and relatively moving the tool holder and the workpiece in a reverse axial direction while rotating the tool holder and pressing the outer circumferential portion of the form roller against the circumferential surface defining the cylindrical bore of the workpiece.

19. The method as claimed in claim 18, further comprising, after completion of pressing the outer circumferential portion of the form roller against the circumferential surface defining the cylindrical bore of the workpiece, moving the form roller apart from the circumferential surface defining the cylindrical bore and subjecting the circumferential surface defining the cylindrical bore to finish boring by pressing the outer periphery of the boring blade against the circumferential surface defining the cylindrical bore while relatively moving the tool holder and the workpiece in the first axial direction.

20. The method as claimed in claim 17, wherein a load is variably applied to the form roller in a radial direction of the form roller during the pressing of the outer circumferential portion of the form roller against the circumferential surface defining the cylindrical bore of the workpiece.

* * * * *